United States Patent [19]

Kinnunen et al.

[11] Patent Number: 6,023,626
[45] Date of Patent: *Feb. 8, 2000

[54] ALLOCATING SPEECH ITEMS TO MOBILE UNITS COMMUNICATING ON DIRECT MODE CHANNEL

[75] Inventors: Kimmo Kinnunen, Jyväskylä; Osmo Schroderus, Sumiainen, both of Finland

[73] Assignee: Nokia Telecommunications Oy, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,268

[22] Filed: Dec. 5, 1996

[30] Foreign Application Priority Data

Dec. 5, 1995 [FI] Finland .................................. 955857

[51] Int. Cl.⁷ .................................................. H04B 7/00
[52] U.S. Cl. ........................................... 455/512; 455/519
[58] Field of Search .................................. 455/31.1, 422, 455/512, 513, 514, 518, 519, 520, 517, 527

[56] References Cited

U.S. PATENT DOCUMENTS

| | | | |
|---|---|---|---|
| 4,677,656 | 6/1987 | Burke et al. | 455/403 |
| 5,465,391 | 11/1995 | Toyryla | 455/518 |
| 5,471,646 | 11/1995 | Schultz | 455/519 |
| 5,634,197 | 5/1997 | Paavonen | 455/512 |

FOREIGN PATENT DOCUMENTS

| | | |
|---|---|---|
| 2271690 | 4/1994 | United Kingdom . |
| WO 93/07723 | 4/1993 | WIPO . |
| WO 94/17642 | 8/1994 | WIPO . |
| WO 95/15666 | 6/1995 | WIPO . |
| WO 95/24655 | 9/1995 | WIPO . |

OTHER PUBLICATIONS

MPT 1343, Performance Specification: System Interface Specification for radio units to be used with commercial trunked networks operating in Band III sub-bands 1 and 2, Jan. 1988, revised Sep. 1991.

*Primary Examiner*—Reinhard J. Eisenzopf
*Assistant Examiner*—Sam Bhattacharya
*Attorney, Agent, or Firm*—Pillsbury Madison & Sutro LLP

[57] ABSTRACT

A method and a mobile unit for allocating speech items to mobile units communicating on a direct mode channel. In the method, a transmission of a first mobile unit is sent during the speech item of that mobile unit on the direct mode channel; a second mobile unit takes the speaking turn; and the transmission of the second mobile unit is sent during the speech item of the second mobile unit on the direct mode channel. The mobile units communicating on the direct mode channel are directed to operate in such a way that the first mobile unit is given the priority to start a speech item or request a speaking turn after the termination of the speech item of the second mobile unit before the other mobile units communicating on the direct mode channel.

23 Claims, 5 Drawing Sheets

ALLOCATING SPEECH ITEMS TO MOBILE UNITS COMMUNICATING ON DIRECT MODE CHANNEL

This application is based on application No. 955857, filed in Finland on Dec. 5, 1995, the content of which is incorporated hereinto by reference.

FIELD OF THE INVENTION

The present invention relates to a method for allocating speech items to mobile units communicating on a direct mode channel. The method comprises the steps of:

sending a transmission of a first mobile unit during the speech item of the first mobile unit on the direct mode channel, a second mobile unit taking the speaking turn, and sending a transmission of the second mobile unit during the speech item of the second mobile unit on the direct mode channel.

The present invention further relates to a mobile unit used for practicing the method.

BACKGROUND OF THE INVENTION

The method of the invention is specifically designed for use in PMR (Private Mobile Radio or Professional Mobile Radio) networks, i.e. trunked networks, which are typically corporate networks or public authority networks wherein all channels are shared by one or more user organizations. In such networks, the subscribers have individual subscriber numbers and also group numbers indicating the communication group or subscriber group the subscriber belongs to. Hence calls intended for subscribers in a specific group can be switched to members of that group.

The method is suitable for use in mobile communications systems with digital as well as analog radio paths. Analog mobile communications systems are described for example in MPT 1327, *A Signalling Standard for Trunked Private Land Mobile Radio Systems*, January 1988, revised and reprinted November 1991, and MPT 1343, *Performance Specification,* January 1988, revised and reprinted September 1991, both published by the United Kingdom Department of Trade and Industry, Radiocommunications Agency.

A group call is one of the essential functions of a private mobile radio system. A group call is used, for example, in all kinds of operations involving more than one participant, particularly when an entire group must be constantly aware of a progression of events. A group call is a conference call in which all participants can speak in turn and hear one another. In group calls, the entire group is called by a common number. A single radio unit, e.g. a mobile unit or a radiotelephone, that is, a subscriber station, may belong to several groups programmed into the radio unit. The programming may be fixed, but it may also be changed by the user of the mobile unit. The system stores information about the base stations related to each group number. The group call may cover one, several or all base stations within the service area of the mobile exchange or several mobile exchanges. When a group call is set up, a traffic channel is allocated at all base stations related to the group, and each of these base stations transmits a group call message comprising the group number and information on the allocated traffic channel. If the mobile unit recognizes the group number included in the group call message, it will switch to the traffic channel indicated in the group call message. Hence, in principle the mobile unit is always available for a group call if it is located within the predetermined operational area of the group and if it is not already engaged in another group call.

In addition to system channels in mobile radio systems, the radio system may employ direct mode channels, i.e. the operation is in direct mode. Subscriber stations communicating in the direct mode do not communicate directly with the radio network or its base stations. Direct mode channels are FDMA frequencies or TDMA time slots on which radiotelephones or other units can communicate outside the system directly with one another, or via repeater stations either with the system base stations or with other mobile units.

Direct mode channels are typically used in situations where, for example, a number of hand portables communicate with one another at a distance from the base station not allowing the system channels to be used.

Another important utility for direct mode channels is in adding capacity when traffic in the system rapidly increases (for example in an incident) in a part of the system service area, for example in a spot-like part thereof.

A direct mode channel is termed a simplex channel or simplex connection. A direct mode channel is a channel that is typically not available for system use at all. It may for example be a channel having a channel spacing equal to that of a mobile communications system, e.g. 12.5 kHz or 25 kHz. Of the radiotelephones communicating on a direct mode channel, the sender has tuned his or her transmitter to the channel and transmits speech or data information. The other radiotelephones that are using direct mode channels have tuned their receivers to the same channel and will hear the transmission directly.

Operation on a direct mode channel may employ analog modulation or digital modulation. A radiotelephone transmitting on a channel may also send signalling information, such as information on user rights and priorities or information about the group communicating on the channel, or data traffic. A direct mode channel may employ encryption or transmit clear speech.

In group call traffic typical to PMR systems, there is a need to provide a normal 'free space' feature, since usually two parties are communicating and the others only want to listen. In that case, it would be desirable that these two subscribers who took part in the communication be able to finish their dialogue before a third party can interrupt the communication with his speech item. In prior art approaches, no solution to the above problem has been provided for the operation of mobile units communicating on a direct mode channel.

The problem with the prior art solutions is that there is no system for direct mode channels that would prioritize the start of speech items of mobile units participating in a group call in such a way that for instance two subscribers that just recently participated in communication would be given an opportunity to finish their dialogue before a speaking turn is given to a third subscriber.

SUMMARY OF THE INVENTION

The description below employs the following terms: A recent user is the same as the user that spoke before the quitting user. A quitting user means a user quitting his or her speaking turn, i.e. terminating his or her speech item.

It is an object of the present invention to solve the problems related with the prior art solutions. Thus the purpose of the invention is to implement recent user priority in a group call in direct mode communication. This means favoring the recent user in a group call on a direct mode channel.

This novel method for allocating speech items is achieved with the method of the invention, which is characterized in that it further comprises the steps of:

sending priority information indicating which mobile user(s) is(are) prioritized to have the next speaking turn on the direct mode channel from the second mobile unit on the direct mode channel, in response to that priority information, taking the next speaking turn to the mobile unit indicated to be prioritized, and sending the transmission of the respective mobile unit during the respective next speaking turn.

A second embodiment of the invention relates to a method for allocating speech items to mobile units communicating on a direct mode channel, the method comprising the steps of:

sending a transmission of a first mobile unit during the speech item of the first mobile unit on the direct mode channel, a second mobile unit taking the speaking turn, and sending a transmission of the second mobile unit during the speech item of the second mobile unit on the direct mode channel.

This method in accordance with the second embodiment of the invention is characterized in that it further comprises the steps of:

sending priority information indicating which mobile user(s) is(are) prioritized to have the next speaking turn on the direct mode channel from the second mobile unit on the direct mode channel, in response to the priority information, taking the next speaking turn to the mobile unit indicated to be prioritized, and sending the transmission of the respective mobile unit during the respective next speaking turn.

The invention further relates to a mobile unit communicating on a direct mode channel, comprising memory means, a transceiver and a control unit for controlling the operation of the mobile unit.

The mobile unit of the invention is characterized in that it comprises controller means for controlling the mobile unit to operate in such a way that after the termination of the speech item of the second mobile unit, it gets the priority to start a speech item or request a speaking turn before the other mobile units communicating on the direct mode channel.

The invention is based on the idea of recent user priority in such a way that such a speaker will get a new speaking turn faster than any other mobile unit communicating on the direct mode channel. The object is that the speaker preceding the quitting speaker will get a speaking turn, if he or she so wishes, immediately after the termination of the speech item of the quitting speaker, so that no other speaker/mobile unit gets a speaking turn before such a recent user.

The basis of the invention lies in the idea that the priority of the speaker preceding the quitting speaker (to get the next speaking turn) is increased in such a way that a speaking turn is granted to him or her more easily than to the others. Recent user priority can also be implemented beyond several speech items in such a way that the procedure favors not only the previous speaker but also the one(s) preceding him.

The idea of the invention is that the second mobile unit that took a speaking turn after the speech item of the first mobile unit and that terminates its speech item, i.e. is quitting its speaking turn, adds to its transmission information on the fact that the speaker preceding the quitting speaker, i.e. the first mobile unit, is prioritized to have the next speaking turn. In response to this information, the first mobile unit may, if it so desires, take the next speaking turn without the other (third) mobile units on the direct mode channel that desire speaking turns disturbing it by transmitting their speech items. It is obvious that the recent user priority may be granted either to the immediately preceding, i.e. first, mobile unit or to several recent users.

It is an advantage of the method and radio unit of the invention that they eliminate the problems with the prior art solutions, i.e. they enable the speaker preceding the quitting speaker to be favored when the next speech item is assigned on a direct mode channel.

BRIEF DESCRIPTION OF THE DRAWINGS

The invention will be explained in closer detail in the following with reference to the accompanying drawings, in which.

DETAILED DESCRIPTION OF PREFERRED EMBODIMENTS OF THE INVENTION

Figure 1:
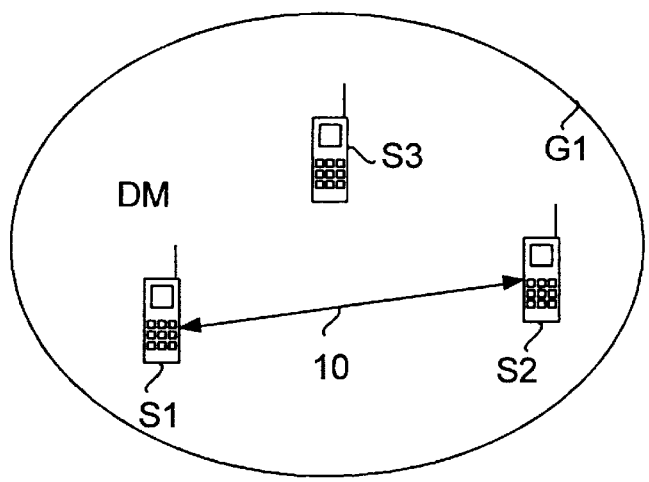
FIG. 1 is a schematic view of a situation where subscribers participate in a group call on a direct mode channel.

FIG. 1 is a schematic view of a situation where subscribers participate in a group call. Subscribers S1, S2, S3, using their mobile units to which the present invention relates, belong to the same group call G1; the other subscribers participating in this group call are not shown. The group call is conducted on a direct mode channel DM. Subscribers S1 and S2 participate in the group call by speaking in turns, thus making a dialogue. In accordance with the invention, both speaking subscribers S1 and S2 primarily assign speaking turns to one another in such a way that the dialogue conducted by these two subscribers can be completed. Subscriber S3 would like to have a speaking turn, but in accordance with the invention the speaking turns are assigned between subscribers S1 and S2 only. Hence, subscriber S3 is prevented from getting a speaking turn until the dialogue between subscribers S1 and S2 is over and the previous speaker has terminated his or her speech item. Arrow 10 in the figure denotes the exchange of speech items between subscribers S1 and S2, in which in accordance with the invention the quitting subscriber S1 inserts into the transmission of his or her speech item information on the fact that the speaker S2 preceding the quitting speaker S1 is prioritized to have the next speech item. In response to this information, the previous speaker S2 may, if he or she so desires, take the next speaking turn without the other (third) mobile units S3 on the direct mode channel that desire to speak disturbing it by transmitting their speaking turn requests or speech items.

Figure 2:
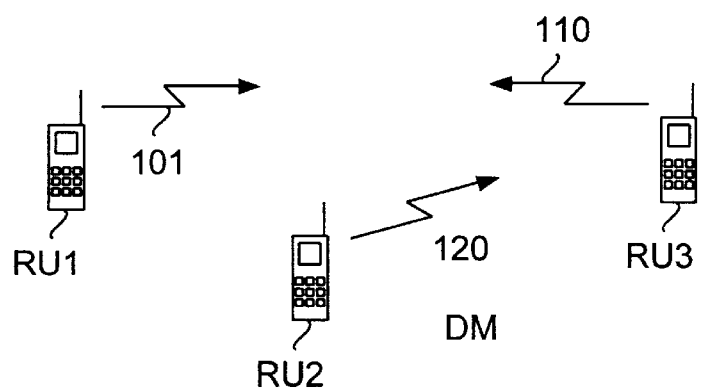
FIG. 2 shows communication of radio units in accordance with the invention on a direct mode channel.

FIG. 2 illustrates communication of radio units RU1, RU2, RU3 in accordance with the invention on a direct mode channel DM. The radio units may be mobile units or any other entities provided with a radio apparatus that are capable of communicating on a direct mode channel. The radio units may also be repeater stations of mobile communications systems. The invention operates in principle as described in connection with FIG. 1. The method of the invention can be implemented for example in the following ways:

1.) The counter of the mobile unit increments upwards in each case after a new speech item; this will be explained in connection with FIG. 3, and 2.) Explicit addressing by means of which the quitting speaker expressly indicates the subscriber(s) who is(are) entitled to have the next speaking turn on the direct mode channel; this will be explained in connection with FIG. 4.

Figure 3A:
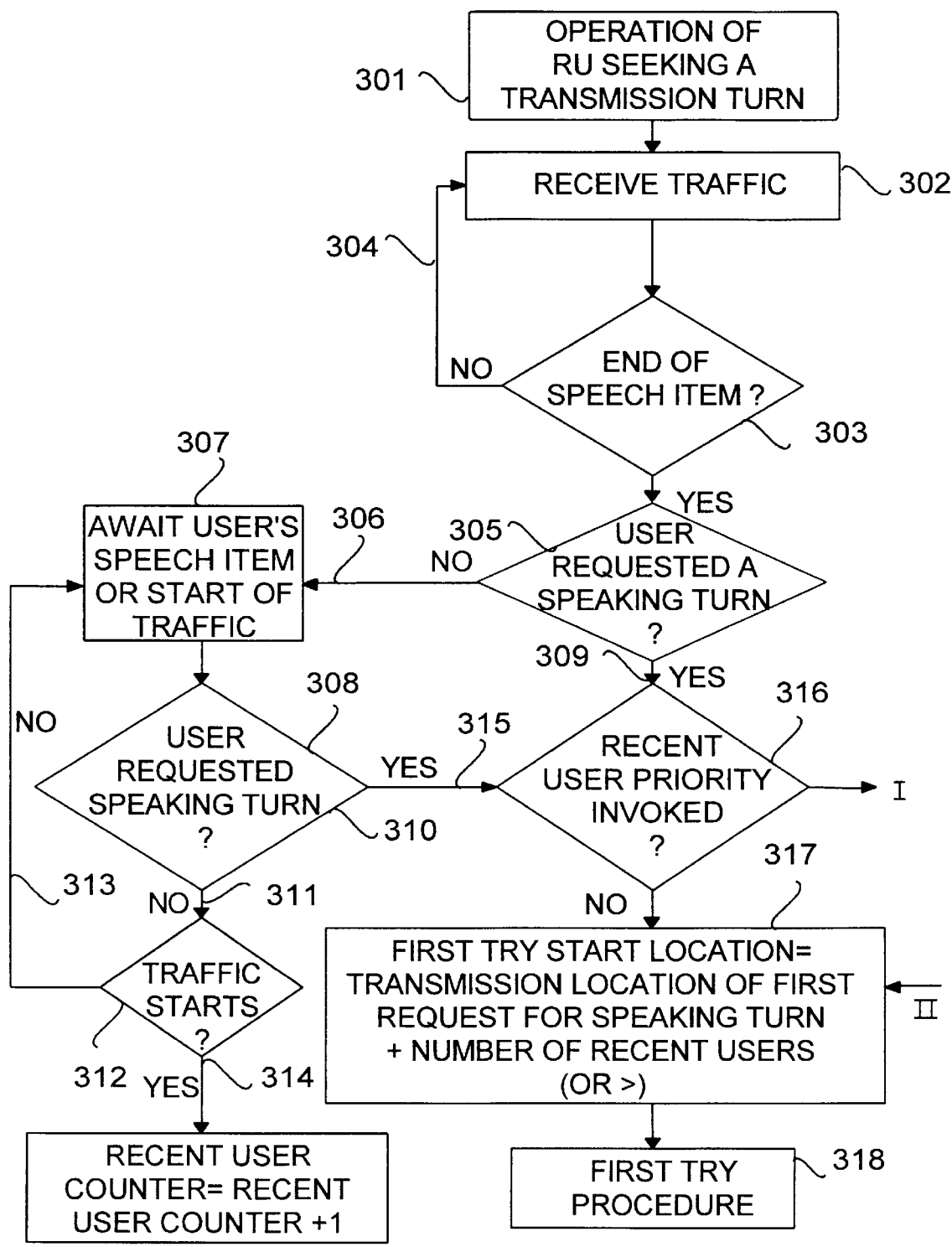
FIGS. 3a and 3b are flow charts illustrating the operation of a mobile unit seeking a transmission turn.
Figure 3B:
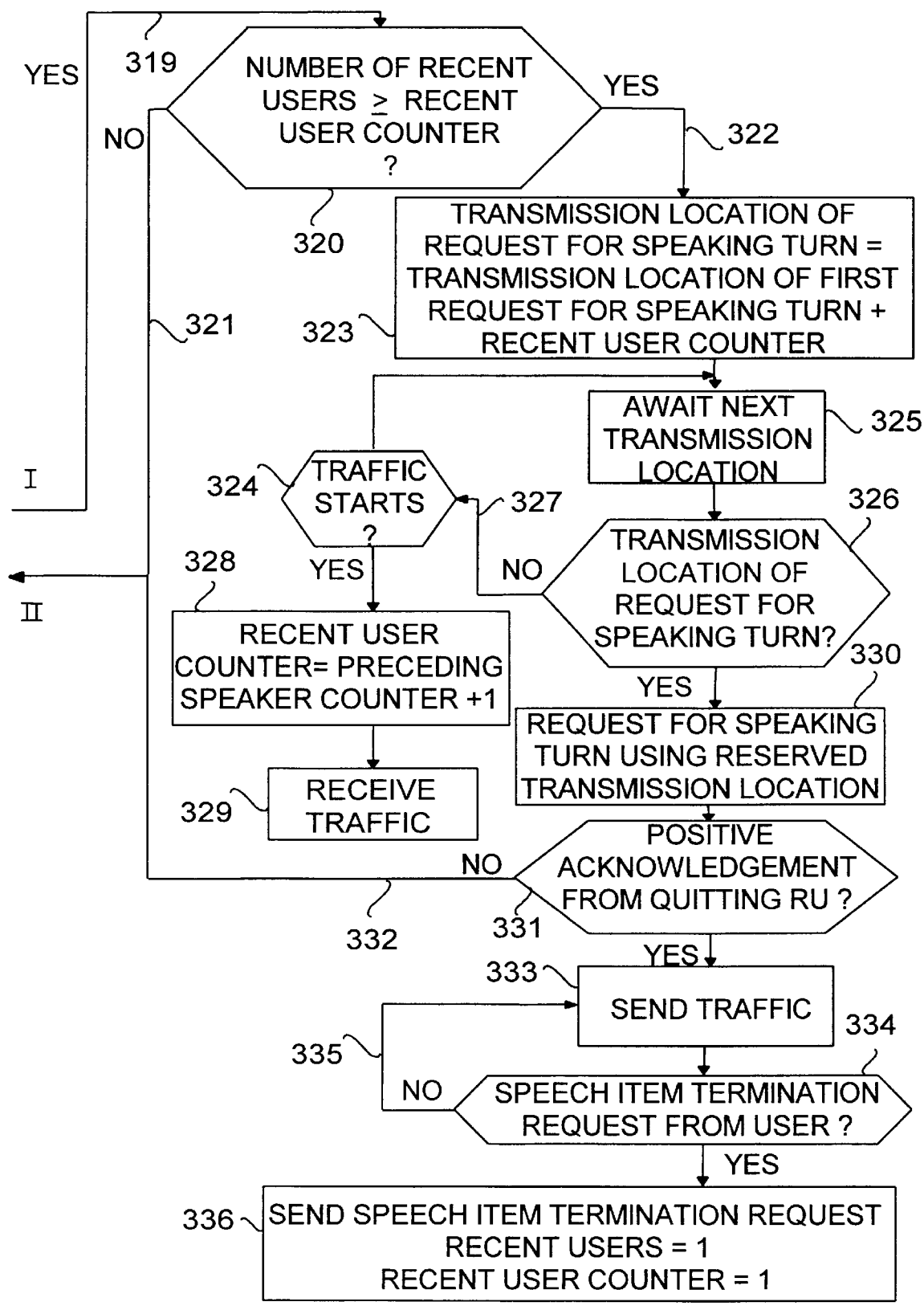

FIGS. 3a and 3b show flow diagrams of the method of the invention. Herein a recent user priority counter incorporated into the mobile units is used. By this means, the mobile unit keeps a record of how many speaking turns have been taken after the respective mobile unit had a speaking turn. This method operates in such a way that the mobile unit terminating its speech item adds to its transmission information on how many recent users are favored when the next speech item is assigned.

In this embodiment of the invention, i.e. the counter alternative, the procedure is such that whenever a mobile unit quits a speaking turn, i.e. stops speaking and possibly stops pressing the PTT (push-to-talk) switch, it resets its priority counter (cf. FIG. 5) to the initial value, e.g. 1. The value of the counter is incremented whenever another mobile unit takes the speaking turn and starts speaking. It is also possible to increment the counter in response to a message informing the mobile unit that another mobile unit has quitted its speaking turn. Namely, as the mobile unit terminates its speech item, i.e. quits its speaking turn, it informs the other mobile units of this fact in its transmission. The transmission of the mobile unit may also include a command to other mobile units to take a speaking turn in such a way that the command only gives a priority to a speaking turn to those mobile units whose priority counter has a given value, for example 1, or 2 if specifically the two preceding speakers are to be given the right to speak, i.e. they are to be favored. The quitting message may include any priority parameter value, depending on how recent or remote preceding mobile unit is to be favored.

In the method, the mobile unit of the quitting user indicates to the other mobile units how many recent users are favored. Typically, only one recent user/mobile unit is favored. The method, however, also makes it possible to favor several preceding mobile units. It is to be noted that the information included in the transmission of the quitting speaker on how many recent users are favored may also be a direct mode channel-specific parameter.

When a recent user wishes to speak after the termination of the speech item, this must be indicated to the mobile unit even before the termination of the speech item of the quitting speaker. One way of indicating this is to press a PTT (push-to-talk) switch in the mobile unit whose user wishes to have the next speaking turn.

A mobile unit seeking a transmission turn stores information on how many speaking turns have been taken after it last sent its transmission as a speech item to the group call in question. If specifically this mobile unit transmitted the previous speech item, the recent user counter parameter of said mobile unit is 1.

The transmission location is calculated using the start location of the first random access frame and the recent user counter of the mobile unit that attempts to transmit.

The mobile unit may start the transmission if any preceding transmission locations have not been used. This is ascertained by the mobile unit by receiving an acknowledgement message from the quitting mobile unit. If there is no acknowledgement from the quitting mobile unit or if the acknowledgement is negative, the mobile unit starts sending a request for a speaking turn in the normal way (first try).

The flow charts shown in FIGS. 3a and 3b illustrate the operation 301 of a mobile unit RU seeking a transmission turn. The mobile unit receives 302 communication on a direct mode channel. Simultaneously, the mobile unit RU monitors 303 whether the speech item of the recent user/subscriber is ending. If the speech item does not terminate, the operation of the mobile unit will revert to the preceding step 302, in which the mobile unit is receiving communication. If, on the other hand, the speech item terminates, the mobile unit RU checks 305 whether its user has requested a speaking turn. If this is not the case 306, the mobile unit RU awaits 307 the speech item of the user or start of communication. In the next step 310, it is examined whether the user has requested a speaking turn, and if he has, 315, the execution of the method proceeds to step 316, in which it is checked whether the recent user priority is invoked or activated. If, on the other hand, it has been found in step 310 that the user has not 311 requested a speaking turn, it is checked in the next step 312 whether communication starts. If not, the execution of the method returns 313 to step 307, in which the user's speech item or start of communication is awaited. If, on the other hand, communication starts, the recent user counter is incremented upwards by one step.

If in step 310 the user had requested 315 a speaking turn, the method goes on to step 316, in which it is examined whether the recent user priority in accordance with the invention is invoked or activated. If not, the method proceeds to step 317, in which the first start location is set to be the same as the transmission location of the first request for a speaking turn, added with the number of recent users. This first start location may also be set to be higher than the above, i.e. higher than the transmission location of the first request for a speaking turn added with the number of recent users. Thereafter step 318 takes the method to the normal first try procedure.

If, on the other hand, it has been found in step 316 that the recent user priority in accordance with the invention is invoked or activated 319, the method proceeds to step 320. This step examines whether the number of recent users is higher than or equal to the value of the recent user counter. If not, the execution of the method proceeds to step 317 wherefrom the method passes on in step 318 to the first try procedure. If, on the other hand, the number of recent users is higher 322 than the value of the recent user counter in step 320, the transmission location of the request for a speaking turn is set in step 323 to be the transmission location of the first request for a speaking turn added with the value of the recent user counter. Thereafter in step 325 the next transmission location is awaited. After that, the transmission location of the request for a speaking turn is examined in step 326. If the location is not correct 327, the method proceeds to step 324, in which it is examined whether communication starts. If, on the other hand, the transmission location is correct, a request for a speaking turn is sent in step 330 using the reserved transmission location, whereafter it is examined in step 331 whether a positive acknowledgement from the quitting mobile unit RU has arrived. If this is not the case 332, the execution of the method proceeds to step 317, in which the first try start location is set. If, on the other hand, the acknowledgement from the quitting mobile unit RU is positive, the method proceeds to step 333, in which the mobile unit is sending its transmission. Thereafter the method proceeds to step 334, in which it is checked whether a speech item termination request arrives from the user. If there is no speech item termination request, 335, from the user, the execution of the method returns to step 333, in which communication is sent. If, on the other hand, a speech item termination request arrives from the user, the execution of the method is continued from step 336 in which the mobile unit quitting the speaking turn sends to other mobile units communicating on the direct mode channel priority information with which the other mobile units are informed that they may attempt to have the next speaking turn if their recent user counter has the value 1. This value is exemplary of favoring the speaker that had a speaking turn immediately before the quitting subscriber. It is also possible to set the priority parameter at some other value, which would mean that another recent user or more than one recent users are favored.

Figure 4A:
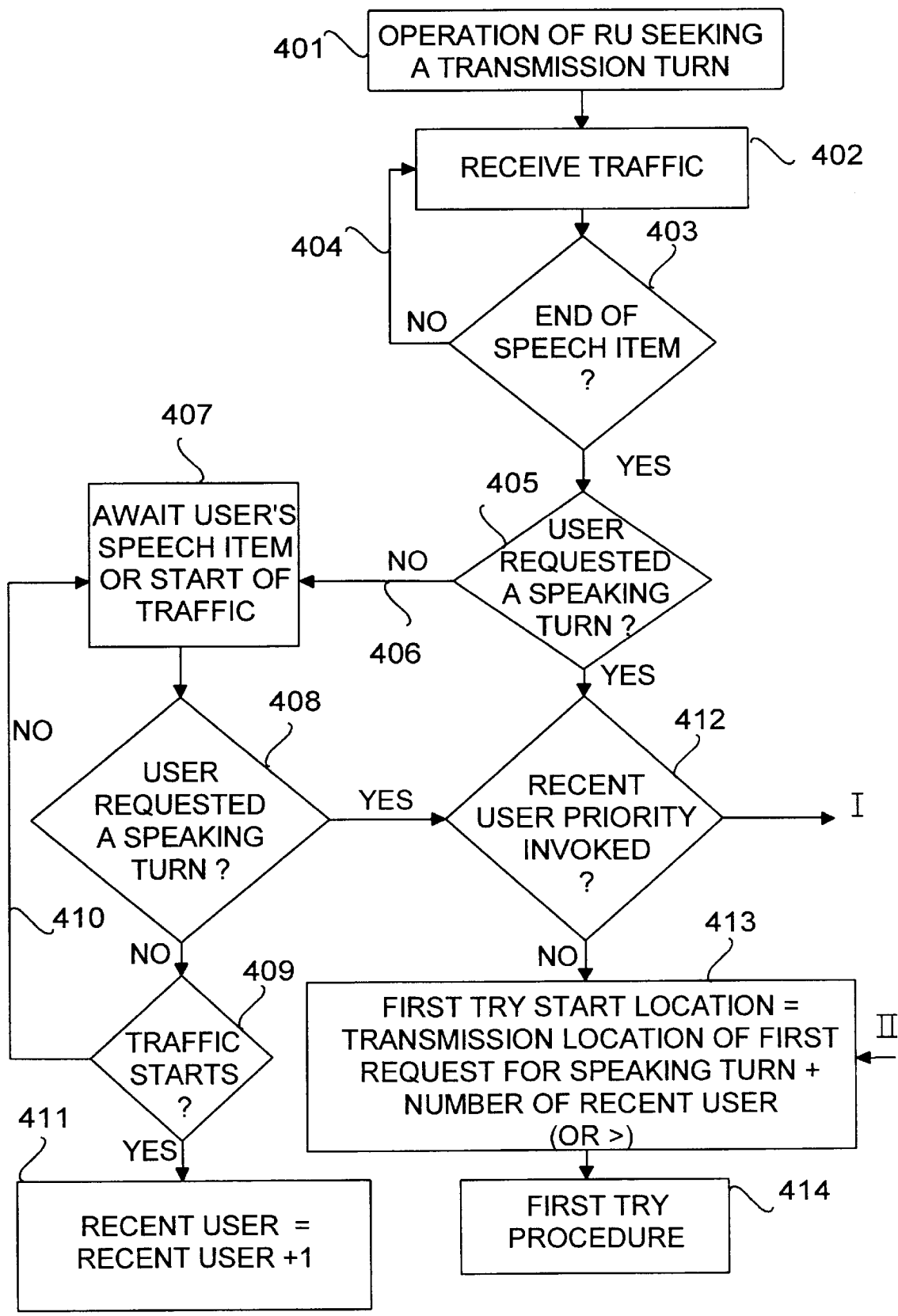
FIGS. 4a and 4b are flow charts illustrating the method in accordance with the invention and, FIG. 5 is a block diagram of a mobile unit in accordance with the invention, communicating on a direct mode channel.
Figure 4B:
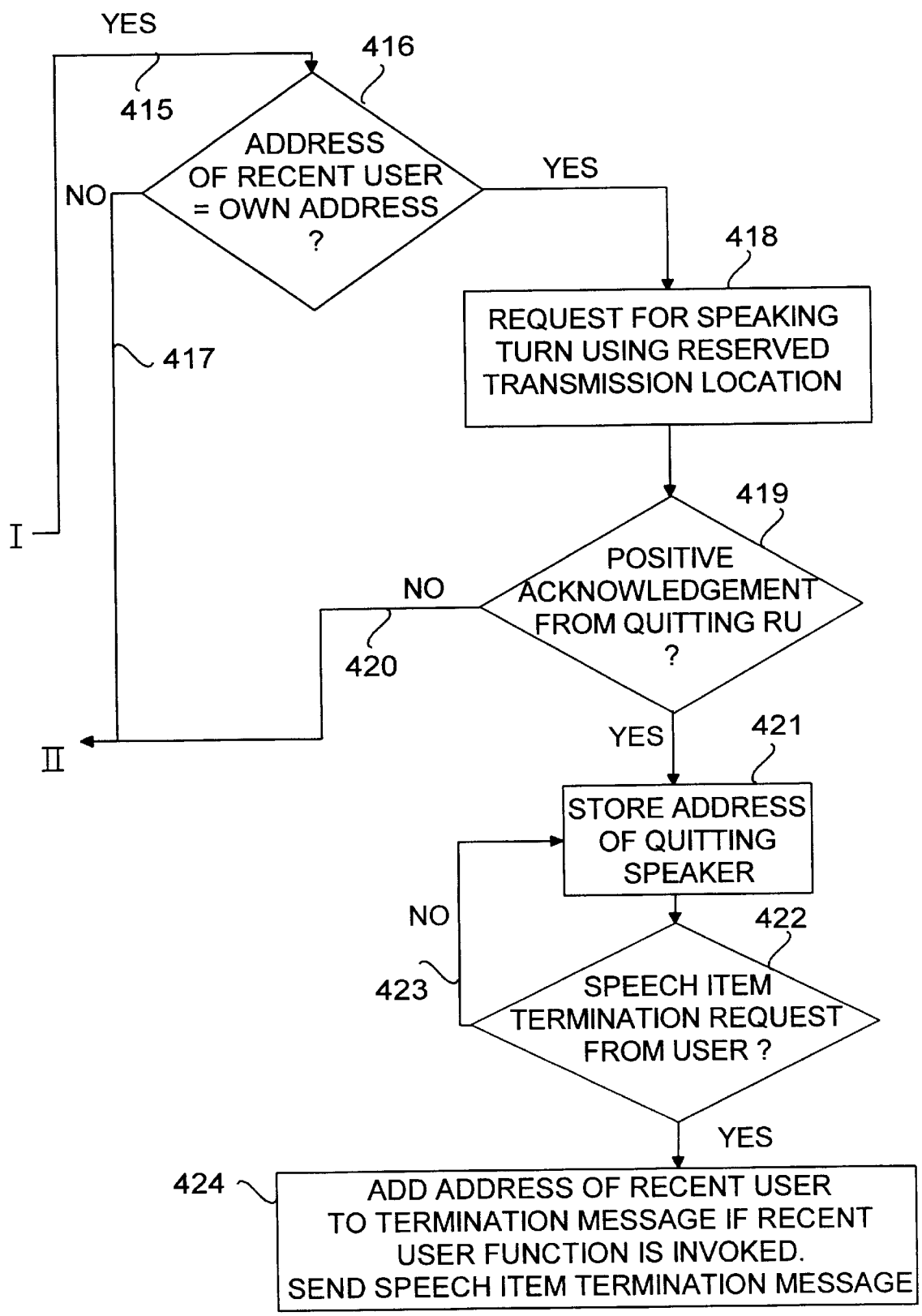

FIGS. 4a and 4b are flow charts illustrating a method in accordance with another embodiment of the invention, using explicit addressing when a quitting speaker assigns speech items to mobile units about to have the next speaking turn.

In this embodiment, the procedure is such that when a mobile unit receives from its user an indication of the fact that the user wants to have the next speaking turn, the mobile unit stores the identifier of the recent user (mobile unit). When the user then terminates his or her speech item, the mobile unit sends in its transmission a prompt to the recent user. In response to this prompt, the recent user may take the speaking turn if he or she so wishes.

In this method, the user terminating his or her speech item, i.e. the quitting user, i.e. mobile unit RU, unequivocally indicates the address of the recent user(s).

When the recent user wishes to speak after the speech item, this has to be indicated to the mobile unit RU already before the termination of the speech item. In FIG. 4, this indication is shown in step 408, in which it is checked whether the user has requested a speaking turn. If the recent user wishes to have a speaking turn, he or she can signal his or her wish for example by pressing his or her PTT switch.

If the address of the mobile unit RU is the same as the one stated as the address of the preceding mobile unit RU (recent user) in the transmission of the speech item of the quitting mobile unit RU, the mobile unit RU may avail of the possibility for a request for a speaking turn reserved for the preceding mobile unit.

The transmission location is counted using the start location of the first random access frame.

If there is no acknowledgement from the quitting mobile unit RU or if the acknowledgement is negative, the mobile unit RU starts the request for a speaking turn in the normal way in accordance with the first try procedure explained above.

In the flow charts of FIGS. 4a and 4b, steps 401–415 correspond to steps 301–319 shown in FIGS. 3a and 3b. The method proceeds to step 416 shown in FIGS. 4a and 4b if it has been found in step 412 that the above-explained recent user priority is invoked or activated in the mobile unit that spoke during the preceding speaking turn. In such a case, it is examined in step 416 whether the address of the recent user is the same as the address of the mobile unit itself. If this is not the case, the execution of the method proceeds 417 to step 413, which has been explained as step 317 in the flow chart of FIG. 3a. If, on the other hand, the address of the recent user is the same as the address of the mobile unit itself, the execution of the method proceeds to step 418, in which the mobile unit sends a request for a speaking turn to the quitting mobile unit which sent a message indicating the termination of its transmission. As a next step, the mobile unit desiring a speaking turn monitors in step 419 whether a positive acknowledgement to the request for a speaking turn made by the mobile unit desiring to speak arrives from the quitting mobile unit. If the acknowledgement is negative 420 or if no acknowledgement arrives, the execution of the method proceeds to step 413 explained above, and from there further to the first try procedure. If, on the other hand, the acknowledgement from the quitting mobile unit is positive, the execution of the method proceeds to step 421, in which the mobile unit stores the address of the preceding (quitting) speaker and starts transmitting, i.e. takes the speaking turn. As long as the user of that mobile unit does not give 423 a speech item termination request, i.e. release the PTT switch, the respective mobile unit sends its transmission, i.e. holds its speaking turn. When a speech item termination request arrives from the user of the mobile unit, i.e. when the user releases the PTT switch, the mobile unit sends 424 to the other mobile units communicating on the direct mode channel the priority information by adding to its transmission the address of the recent user, if the recent user priority is invoked or activated.

In operating in accordance with another embodiment of the invention, the procedure is such that the priority information is speech item identifier information indicating the identifier of one or more preceding speech items whose speakers are prioritized to have the next speaking turn. Herein the speech item identifier information is compared in the mobile units that have received the priority information with the information stored in the mobile unit on the identifiers of the speech items that the respective mobile unit has had. If the respective comparison shows that the mobile unit is prioritized to have the next speaking turn and the user of the respective mobile unit has indicated his or her desire to have the next speaking turn, the respective mobile unit takes the respective next speaking turn, unless another mobile unit indicated to be prioritized has reserved the respective next speaking turn previously.

Figure 5:
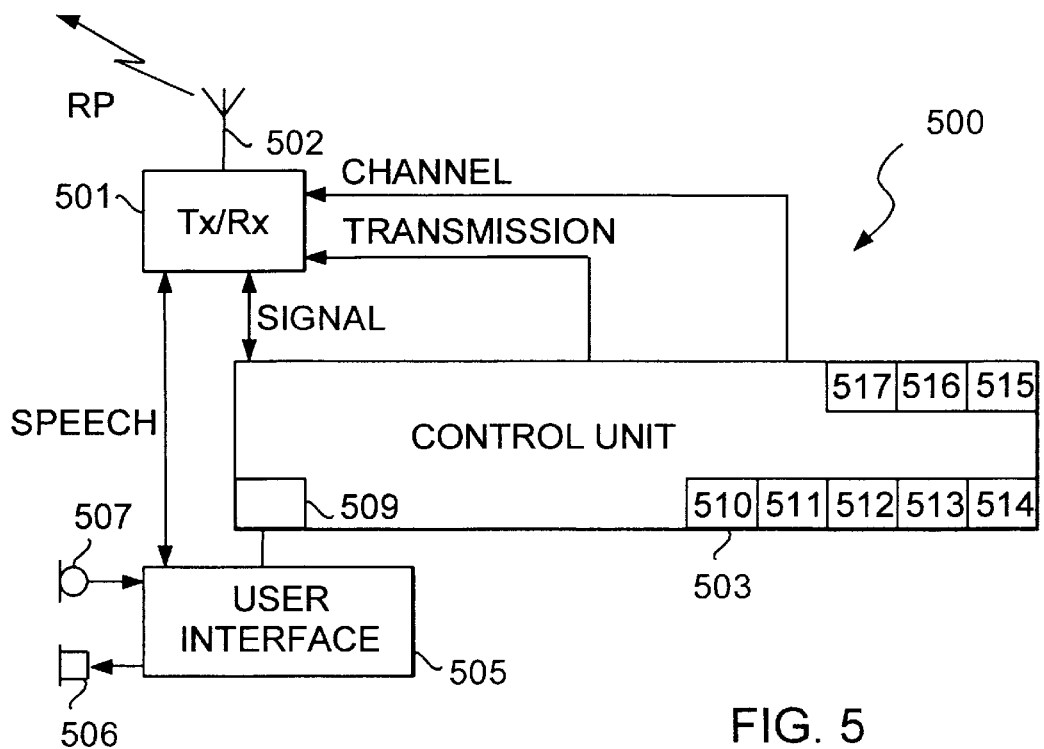

FIG. 5 is a block diagram of a mobile unit 500, i.e. a radiotelephone used by a subscriber, a mobile unit, or a subscriber station, communicating on a direct mode channel. The task of transceiver (TX/RX) 501 is to tune to the radio channel used in each case. The transceiver 501 incorporates an antenna 502 connected to a radio path RP. Normally radio frequencies between 60 MHz and 1000 MHz are employed (VHF and UHF ranges), even though other frequencies may be used as well. Analog modulation may be used in the radio path RP, the mode of modulation normally being phase modulation. Also other modes of modulation may be used. A voice-frequency subcarrier (FFSK), for example, may be employed for transmission of signalling. The radio path may also be conveyed digitally. The mobile unit may adapt to and communicate on the uplink and downlink frequencies of the direct mode channel.

User interface 505 comprises electroacoustic transducer means, typically an earphone 506 and a microphone 507, and possibly keys pertaining to initiating and terminating a call and to selection. Since in a trunked system and especially on a direct mode channel communication in a radio path RP is advantageously simplex, the handset usually also has a push-to-talk (PTT) switch, which has to be pressed during the speech item. The push-to-talk switch is not shown in FIG. 7.

The task of control unit 503 is to control the operation of the mobile unit. The control unit 503 has access to the user interface 505 wherefrom it obtains impulses for the initiation and termination of a call, for instance. The control unit 503 may also give to the user audio signals or visual signals related to operation of the radiotelephone and/or mobile radio system through the user interface 505.

The control unit 503 is connected to the transceiver TX/RX 501. The channel used by the transceiver is determined by the control unit 503, which means that the transceiver 501 tunes to the channel, i.e. radio frequency, determined by the control unit 503 and to a suitable time slot. The mobile unit of the invention is capable of tuning to a direct mode channel and to the uplink and downlink channels (frequencies) of system channels and also to a desired time slot on the channel. The transceiver 501 is also switched on under the control of the control unit 503. The control unit 503 receives and sends signalling messages through the transceiver 501. A mobile unit 500 in accordance with the invention, communicating on a direct mode channel, may for instance be used in a radio system comprising a radio network with at least one base station and subscriber stations and possibly one or more repeater/gateway stations transmitting communication between at least one base station and subscriber stations communicating on the direct mode channel.

The mobile unit communicating on a direct mode channel comprises memory means 510, a transceiver 501 and a control unit 503 for controlling the operation of the mobile unit.

A mobile unit RU1, RU2; 500 (FIG. 5) in accordance with the invention comprises: controller means 516 for controlling the mobile unit RU1 to operate in such a way that it gets the priority to start a speech item or request a speaking turn after the termination of the speech item of a second mobile unit RU2 before the other mobile units RU3 communicating on the direct mode channel.

The mobile unit in accordance with the invention is characterized in that the controller means 516 for controlling the mobile unit RU1 to operate are adapted to give the first mobile unit RU1 the priority to start a speech item or request a speaking turn immediately after the termination of the speech item of the second mobile unit RU2 within a predetermined time period.

The mobile unit RU1; 500 (FIG. 5) of the invention further comprises: adder means 517 for adding information to the transmission of the mobile unit RU1 when the mobile unit RU1 quits its previous speaking turn, the information indicating that the mobile unit RU1 wishes to have the priority to start a speech item or request a speaking turn immediately after the termination of the speech item of the second mobile unit RU2 that took the next speaking turn.

The mobile unit of the invention further comprises transmitter means 511 for sending priority information indicating which mobile unit(s) is(are) prioritized to request the next speaking turn on the direct mode channel.

The mobile unit of the invention further comprises a priority counter 512. The value shown by the counter indicates the number of speaking turns taken by other mobile units after the speech item of said mobile unit.

In the mobile unit of the invention, said transmitter means are adapted to insert into the priority information the priority parameter value, indicating how many recent speakers are favored.

The mobile unit of the invention further comprises comparator means 513 for comparing 320 the value of the priority parameter included in the priority information received by the mobile unit with the value stored in the mobile unit's priority counter 512, and in response to the comparison, if the comparison shows that the mobile unit is prioritized to have the next speaking turn, directing the mobile unit to take the next speaking turn, unless another mobile unit indicated to be prioritized has reserved the next speaking turn previously.

Furthermore, the transmitter means 511 in the mobile unit are adapted to insert into the priority information the identifier of the mobile unit that had the previous speaking turn, in response to which the preceding mobile unit takes the next speaking turn.

The mobile unit of the invention further comprises speech item initiating means 514 responsive to the identifier of the first mobile unit included in the priority information sent by the second mobile unit RU2, in order for the respective mobile unit to take the next speaking turn.

The mobile unit of the invention is further characterized in that the transmitter means 511 are adapted to include in the respective priority information speech item identifier information indicating the identifier(s) of the preceding speech item(s) whose speakers are prioritized to have the next speaking turn.

The mobile unit of the invention further comprises comparator means 515 for comparing the speech item identifier information included in the priority information received by the respective mobile unit with the information stored in the respective mobile unit on the identifiers of the speaking turns that the respective mobile unit has had, and in response to the comparison, if the comparison shows that the respective mobile unit is prioritized to have the next speaking turn, directing the respective mobile unit to have the next speaking turn, unless another mobile unit indicated to be prioritized has reserved the respective next speaking turn previously.

The drawings and the description pertaining to them are only intended to illustrate the idea of the invention. The method and mobile unit in accordance with the invention for allocating speech items to mobile units communicating on a direct mode channel may vary in their details within the scope of the claims. Even though the invention has been explained in the above mainly in the context of PMR mobile units, the invention may be used in connection with other radiotelephones or other mobile units or mobile telephones as well.

We claim:

1. A method for allocating speech items to mobile units communicating on a direct mode channel in which mobile units may communicate directly or via a repeater, but without intervention by a radio network, including without intervention by a base station, said method comprising:

sending a transmission of a first mobile unit during a speech item of said first mobile unit on said direct mode channel, a second said mobile unit taking a speaking turn on said direct mode channel by sending a transmission of said second mobile unit during said speech item of said second mobile unit on said direct mode channel; and directing said mobile units communicating on said direct mode channel to operate so that said first mobile unit is given a priority to start transmitting a speech item or to request a speaking turn after termination of said speech item of said second mobile unit, before any other mobile unit communicating on said direct mode channel by adding, by said second mobile unit, to transmission information that a preceding speaker is prioritized to have the next speaking turn.

2. The method as claimed in claim 1, wherein
said directing comprises giving said first mobile unit priority to start a speech item or request a speaking turn after said termination of said speech item of said second mobile unit, before such at least another mobile unit communicating on said direct mode channel, by giving only said first mobile unit a right to start a speech item or request a speaking turn immediately after said termination of said speech item of said second mobile unit within a predetermined time period.

3. The method as claimed in claim 1, wherein
said directing comprises, after said termination of said speech item of said second mobile unit, giving said first mobile unit priority to start a speech item or request a speaking turn before said at least another mobile unit communicating on said direct mode channel so that when said first mobile unit quits a previous speaking turn, said first mobile unit adds to transmission information the fact that said first mobile unit wants to have a priority to start a speech item or request a speaking turn immediately after said termination of said speech item of said second mobile unit that took the next speaking turn.

4. A method for allocating speech items among a plurality of mobile units communicating on a direct mode channel, where mobile units may communicate directly or via a repeater, but without intervention by a radio network including without intervention by a base station, said method comprising:
sending a transmission of a first said mobile unit taking a speaking turn on said direct mode channel;
a second said mobile unit taking a speaking turn on said direct mode channel by sending a transmission of said second mobile unit during said speech item of said second mobile unit on said direct mode channel;
said second mobile unit sending, during transmission by said second mobile unit, priority information, indicating which at least one of said mobile units is prioritized to have a respective next speaking turn on said direct mode channel, after said second mobile unit, on said direct mode channel; and
in response to said priority information, at least one receiving respective said mobile unit indicated to be prioritized taking a respective next speaking turn, by sending a respective transmission of the respective said mobile unit indicated to be prioritized during said respective next speaking turn.

5. The method as claimed in claim 4, wherein said priority information includes a priority parameter value indicating how many recent users are favored as said at least one of said mobile units indicated to be prioritized, and said method further comprising:
establishing prioritization, by comparing in said mobile units communicating on said direct mode channel and that received said priority information, said priority parameter value, with a value of a priority counter maintained in the respective said mobile unit, said priority counter value indicating a number of speaking turns that others of said mobile units have had after a respective most recent speech item of the respective said mobile unit; and
if said comparison shows that the respective mobile unit is prioritized to have a respective next speaking turn and a user of the respective said mobile unit has indicated a wish to have the next speaking turn, taking said respective next speaking turn by the respective said mobile unit, unless another said mobile unit indicated to be prioritized has previously reserved said respective next speaking turn.

6. The method as claimed in claim 5, wherein said establishing prioritization further comprises:
maintaining in each respective said mobile unit, a respective said priority counter, which indicates the number of speaking turns that others of said mobile units have had after a respective most recent speech item of a respective said mobile unit;
resetting each respective said priority counter to an initial value whenever the respective said mobile unit having the respective said priority counter terminates a respective speech item;
in response to receiving priority information sent by said second mobile unit, incrementing a value of said priority counter when another said mobile unit terminates a speech item; and
comparing said priority parameter value included in said priority information with a respective priority counter value stored in said priority counter of a respective said mobile unit, and if said priority parameter value included in said priority information is the same or higher than said priority counter value of said respective mobile unit and a user of said respective mobile unit has indicated a desire to have a respective next speaking turn, taking said respective next speaking turn by said respective mobile unit, unless another mobile unit indicated to be prioritized has previously reserved said respective next speaking turn.

7. The method as claimed in claim 4, further comprising:
said priority information being speech item identifier information indicating a respective identifier of each of one or more preceding speech items having users, the respective said mobile units of whom are prioritized to have a respective next speaking turn;
comparing said speech item identifier information in each said mobile unit that received said priority information, with information stored in the respective mobile unit regarding respective identifiers of speaking turns that the respective said mobile unit has had; and
if said comparison indicates that the respective said mobile unit is prioritized to have the respective next speaking turn and the user of said mobile unit has indicated a desire to have the respective next speaking turn, taking the next speaking turn by the respective said mobile unit, unless another mobile unit indicated to be prioritized has previously reserved the respective said next speaking turn.

8. The method as claimed in claim 4, wherein
said priority information sent by said second mobile unit regarding the mobile unit prioritized to have the respective next speaking turn is said identifier of the respective mobile unit that had a respective previous speaking turn, in response to which said first mobile unit takes the respective said next speaking turn.

9. The method as claimed in claim 8, further comprising:
inserting said identifier of said first mobile unit into said transmission of said first mobile unit;
storing said identifier of said first mobile unit that was included in said transmission of said first mobile unit in a memory of said second mobile unit;
taking a respective next speaking turn by said second mobile unit;
sending priority information indicating said identifier of a respective said mobile unit that had a respective previous speaking turn from said mobile unit; and
in response to receiving said identifier of said first mobile unit included in the priority information sent by said second mobile unit, taking a respective next speaking turn by said first mobile unit.

10. A mobile unit communicating on a direct mode channel on which said mobile unit and a second mobile unit and other mobile units are arranged to communicate directly or via a repeater, but without intervention by a radio network, including without intervention by a base station, comprising:

a memory;

a transceiver; and a control unit for controlling operation of said mobile unit, said control unit comprising:

a controller which controls said mobile unit to operate so that, after termination of a speech item of said second mobile unit, said mobile unit gets a priority to start a speech item or request a speaking turn before said other mobile units in response to information transmitted by said second mobile unit, said information indicating that a mobile unit having a speaking turn preceding said speech item of said second mobile unit is prioritized to have a next speaking turn, when said mobile unit is said preceding mobile unit having said speaking turn preceding said speech item.

11. The mobile unit in accordance with claim 10, wherein said controller is adapted to give said mobile unit priority to start a speech item or request a speaking turn immediately after termination of said speech item of said second mobile unit within a predetermined time period.

12. The mobile unit in accordance with claim 10, further comprising:

an adder which adds information to a transmission of said mobile unit when said mobile unit quits a respective previous speaking turn, said information indicating that said mobile unit wishes to have priority to start a speech item or request a speaking turn immediately after termination of a respective next speech item of said second mobile unit that took a respective next speaking turn.

13. The mobile unit as claimed in claim 10, further comprising:

a transmitter which sends priority information indicating which at least one mobile unit is prioritized to have a respective next speaking turn on said direct mode channel.

14. The mobile unit as claimed in claim 10, further comprising:

a priority counter arranged to store a priority counter, which indicates a number of speaking turns to be taken by said other mobile units after a respective speech item of said mobile unit.

15. The mobile unit as claimed in claim 13, wherein said transmitter is adapted to include in said priority information, a priority parameter value indicating how many recent users are favored.

16. The mobile unit as claimed in claim 15, further comprising:

a comparator which compares said priority parameter value included in said priority information received by said mobile unit, with a priority counter value stored in a priority counter, and, in response to said comparison, if said comparison shows that said mobile unit is prioritized to have a respective next speaking turn, directing said mobile unit to take the next speaking turn, unless another said mobile unit indicated to be prioritized previously has reserved said respective next speaking turn.

17. The mobile unit as claimed in claim 13, wherein said transmitter is adapted to insert into said priority information, an identifier of the respective mobile unit which had a respective previous speaking turn, in response to which said respective mobile unit which had a respective previous speaking turn is arranged to take a respective next speaking turn.

18. The mobile unit as claimed in claim 17, further comprising:

a speech item initiator responsive to said identifier of said mobile unit as included in said priority information sent by said second mobile unit in order for said mobile unit to take a respective next speaking turn.

19. The mobile unit as claimed in claim 13, wherein said transmitter is adapted to include in said priority information, speech item identifier information indicating the respective identifier of each respective preceding speech item whose respective speaker is prioritized to have a respective next speaking turn.

20. The mobile unit as claimed in claim 19, further comprising:

item identifier information included in said priority information received by said mobile unit with information stored in said mobile unit regarding said identifiers of said speaking turns that said mobile unit has had, and in response to said comparison, if said comparison shows that said mobile unit is prioritized to have a respective next speaking turn, directing said mobile unit to take the respective next speaking turn, unless another said mobile unit indicated to be prioritized previously has reserved said respective next speaking turn.

21. The mobile unit claimed in claim 14, further comprising:

a comparator which compares said priority parameter value included in said priority information received by said mobile unit, with a priority counter value stored in said priority counter, and, in response to said comparison, if said comparison shows that said mobile unit is prioritized to have a respective next speaking turn, directing said mobile unit to take the respective next speaking turn, unless another said mobile unit indicated to be prioritized has reserved said next speaking turn previously.

22. The mobile unit as claimed in claim 15, further comprising:

a comparator which compares said priority parameter value included in said priority information received by said mobile unit, with a priority counter value stored in said priority counter, and, in response to said comparison, if said comparison shows that said mobile unit is prioritized to have a respective next speaking turn, directing said mobile unit to take the respective next speaking turn, unless another said mobile unit indicated to be prioritized previously has reserved said respective next speaking turn.

23. A method for allocating speaking turns to mobile units communicating on a direct mode channel, where mobile units may communicate directly, or via a repeater, but without intervention by a radio network, including without intervention by a base station, said method comprising:

a first said mobile unit starting a group call on said direct mode channel by sending a transmission of said first mobile unit during a speech item of said first mobile unit on said direct mode channel;

a second said mobile unit taking a speaking turn on said direct mode channel after said first mobile unit by sending a transmission of said second mobile unit during said speech item of said second mobile unit on said direct mode channel; and assigning speaking turns to one another by said first and second mobile units by sending, during said transmissions of said first and second mobile unit, priority information indicating that a recent mobile unit is prioritized to have a next speaking turn on said direct mode channel after said transmission is over on said direct mode channel.

* * * * *